(12) United States Patent
Sotome et al.

(10) Patent No.: US 7,488,020 B2
(45) Date of Patent: Feb. 10, 2009

(54) WORKPIECE-GRIPPING CHUCK AND METHOD FOR CONTROLLING THE SAME

(75) Inventors: Motohiro Sotome, Ayase (JP); Yuji Tsuda, Hadano (JP)

(73) Assignee: SMC Kabushiki Kaisha, Tokyo (JP)

( * ) Notice: Subject to any disclaimer, the term of this patent is extended or adjusted under 35 U.S.C. 154(b) by 374 days.

(21) Appl. No.: 11/350,100

(22) Filed: Feb. 9, 2006

(65) Prior Publication Data
US 2006/0175852 A1 Aug. 10, 2006

(30) Foreign Application Priority Data
Feb. 10, 2005 (JP) ............................. 2005-034934

(51) Int. Cl.
*B25J 15/08* (2006.01)
(52) U.S. Cl. ...................... 294/88; 294/119.1; 294/907; 901/37; 901/38; 901/46
(58) Field of Classification Search .................. 294/88, 294/119.1, 907; 901/37, 38, 46; 269/30, 269/32
See application file for complete search history.

(56) References Cited

U.S. PATENT DOCUMENTS

| 4,024,959 A | | 5/1977 | Gruner |
| 4,255,975 A | | 3/1981 | Debreuille |
| 4,632,631 A | * | 12/1986 | Dunlap ........................ 414/736 |
| 4,707,013 A | * | 11/1987 | Vranish et al. ............ 294/119.1 |
| 4,808,898 A | | 2/1989 | Pearson |
| 5,080,415 A | * | 1/1992 | Bjornson .................. 294/119.1 |
| 5,163,729 A | * | 11/1992 | Borcea et al. ............. 294/119.1 |
| 6,308,431 B1 | | 10/2001 | Takanashi et al. |
| 6,309,003 B1 | * | 10/2001 | Bertini ..................... 294/119.1 |
| 6,547,258 B2 | * | 4/2003 | Mandokoro et al. ........ 279/4.12 |

FOREIGN PATENT DOCUMENTS

| DE | 23 55 971 | 5/1975 |
| JP | 7-328977 | 12/1995 |

* cited by examiner

*Primary Examiner*—Dean J Kramer
(74) *Attorney, Agent, or Firm*—Paul A. Guss

(57) ABSTRACT

A workpiece-gripping chuck includes a converting mechanism provided in a body, which converts a driving force from a rotary driving source into a displacement in the axial direction. First and second pistons of the converting mechanism are displaced in the axial direction under a rotary action of a pinion gear. Further, the first and second pistons are displaced in the axial direction, respectively, by supplying a pressure fluid from a first or second port formed in the body. A workpiece may be positioned by means of a pair of gripping members under the driving action of the rotary driving source, and the workpiece is further gripped by the gripping members by applying a pressing force of the pressure fluid in addition to the driving force.

12 Claims, 13 Drawing Sheets

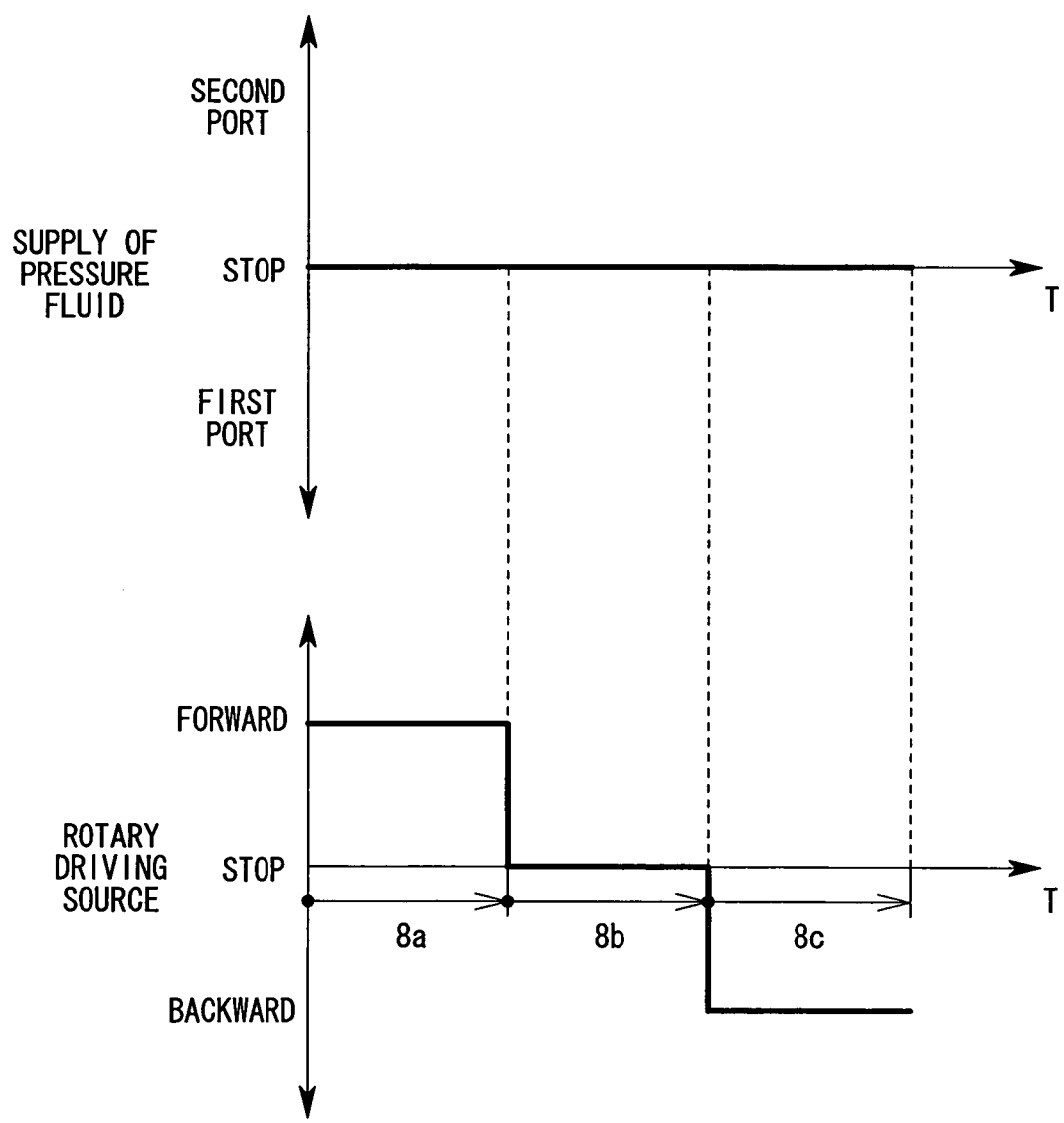

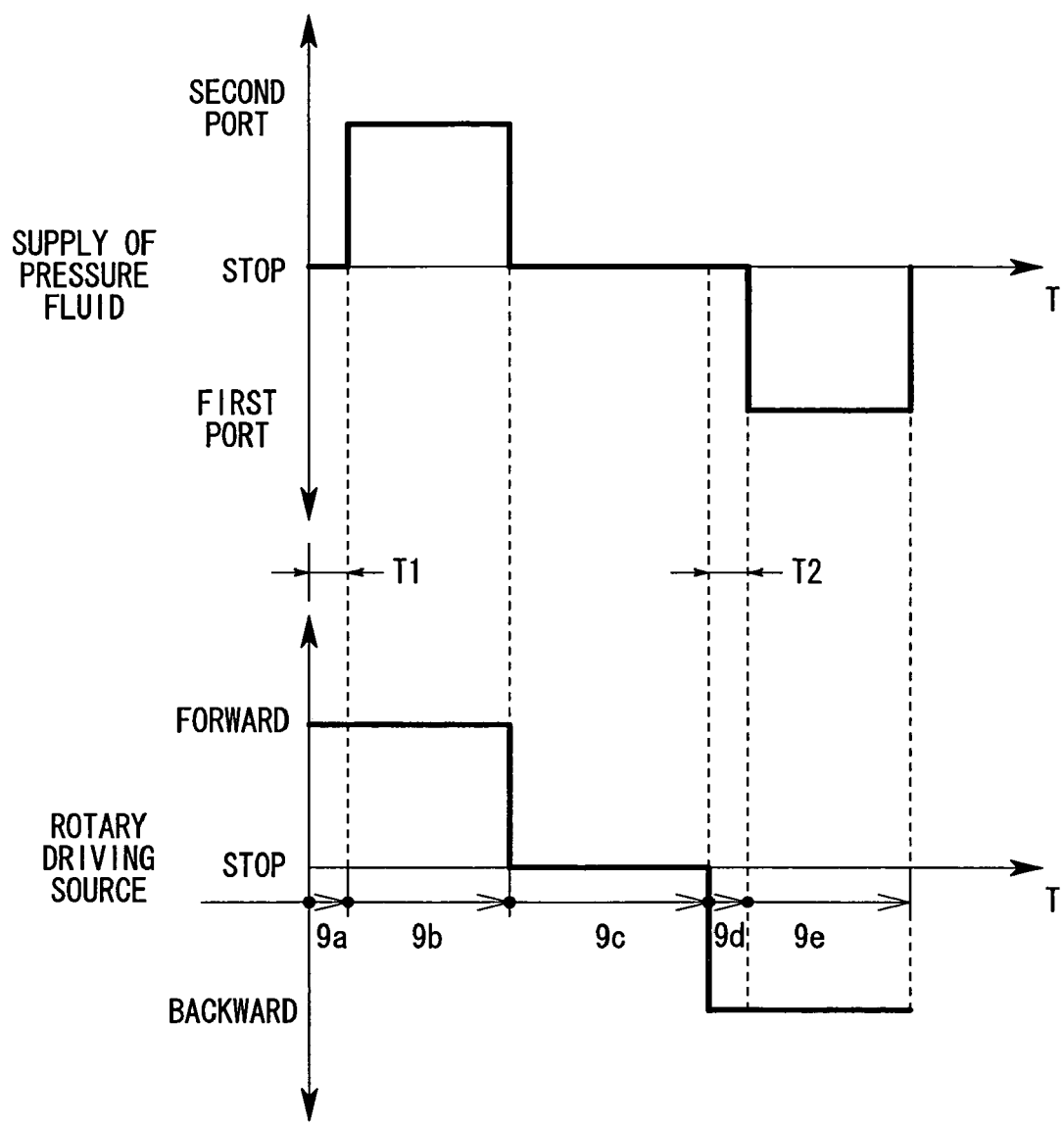

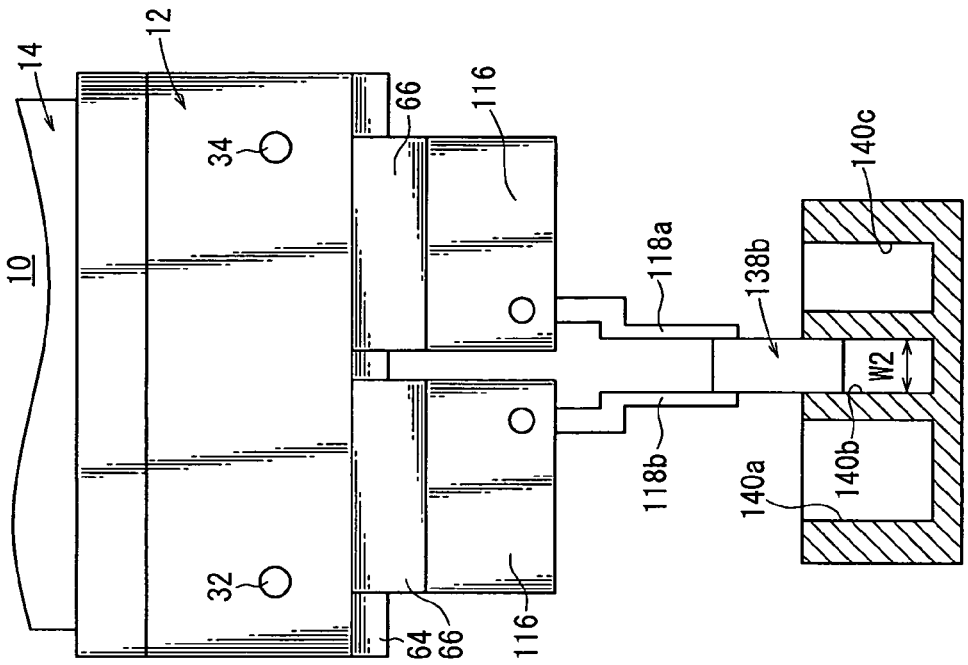
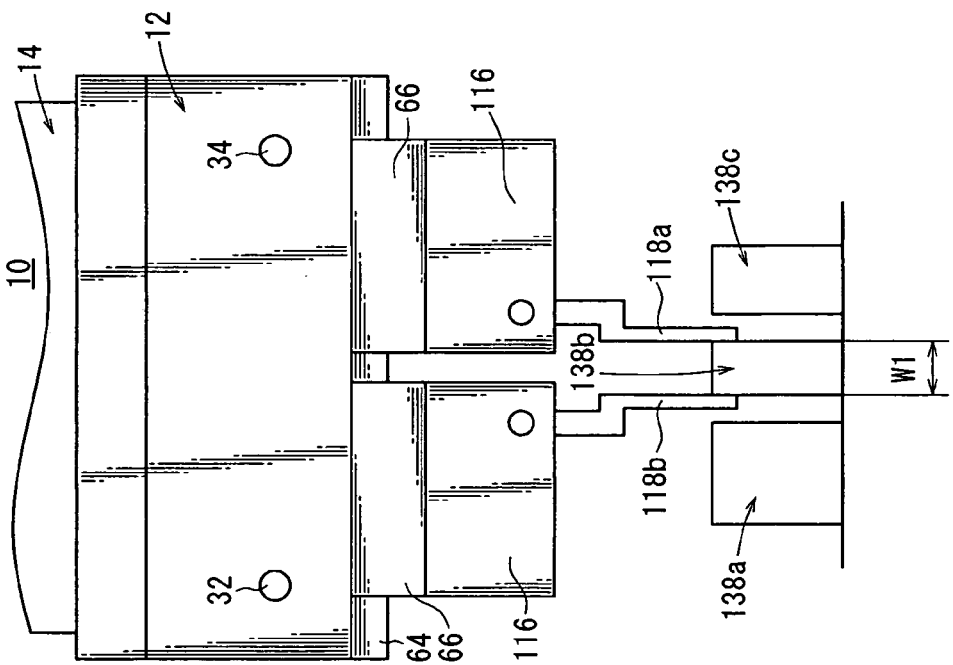

WORKPIECE-GRIPPING CHUCK AND METHOD FOR CONTROLLING THE SAME

BACKGROUND OF THE INVENTION

1. Field of the Invention

The present invention relates to a workpiece-gripping chuck capable of gripping a workpiece by an opening/closing action of a gripping section, and a method for controlling the same.

2. Description of the Related Art

A workpiece-gripping chuck has been hitherto known, which is attached, for example, to a forward end of a shaft section of a machine tool or the like, and which grips a workpiece, such as various types of parts, by causing a gripping section to effect an opening/closing operation by supplying a pressure fluid to the gripping section.

The present applicant has suggested a workpiece-gripping chuck capable of gripping a workpiece by means of opening and closing a gripping section through a pressurizing action of a pressure fluid (see, Japanese Laid-Open Patent Publication No. 7-328977).

The workpiece-gripping chuck comprises a body provided with a pair of ports for supplying the pressure fluid, wherein a piston, which is provided in the body, is displaced in an axial direction under the pressurizing action effected by the pressure fluid. Accordingly, a shaft section of the piston rotates a pinion, which is rotatably supported by the body through the aid of a rack formed on a side surface thereof. A pair of gripping members is rotatably supported by the rotary shaft of the pinion respectively. The gripping members are displaced in a direction so as to approach one another, or to separate from each other, about the center of the rotary shaft due to the rotary action of the pinion. Accordingly, the gripping members are displaced in a direction so as to approach one another, and the workpiece is gripped between the gripping members. (See, for example, Japanese Laid-Open Patent Publication No. 7-328977.)

An air-driving type of workpiece-gripping chuck, as disclosed in Japanese Laid-Open Patent Publication No. 7-328977, in which the pair of gripping members are opened/closed under a pressurizing action of the pressure fluid, is advantageous in that a large gripping force is obtained through use of the pressure fluid. However, it is difficult to arbitrarily control the opening/closing amount of the gripping members. In other words, the workpiece-gripping chuck is capable of performing only operations of fully opening or fully closing the gripping members.

In recent years, a workpiece-gripping chuck has been sought, which provides a predetermined amount of gripping force when a workpiece is gripped, and in addition, which is capable of freely controlling the opening/closing amount of the gripping members depending on the shape of the workpiece and/or the environment of use.

SUMMARY OF THE INVENTION

A general object of the present invention is to provide a workpiece-gripping chuck in which the opening/closing amount of gripping members can be arbitrarily controlled when a workpiece is gripped, and wherein a sufficient gripping force can be obtained for the workpiece, along with a method for controlling opening/closing of the workpiece-gripping chuck.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a characteristic diagram illustrating the relationship between a supply state of the pressure fluid to the cylinder chambers and an application state of a control signal to the rotary driving source, when positioning control only is performed by the chuck;

FIG. 9 is a characteristic diagram illustrating the relationship between a supply state of the pressure fluid to the cylinder chambers and an application state of a control signal to the rotary driving source, when positioning control and a workpiece-gripping operation are performed with the workpiece-gripping chuck;

FIGS. 12A and 12B are magnified front views illustrating a case in which a widthwise dimension of a workpiece is measured using the workpiece-gripping chuck, and wherein the workpiece is moved to an insertable installation hole so that the workpiece can be inserted into the installation hole.

DESCRIPTION OF THE PREFERRED EMBODIMENTS

Figure 1:
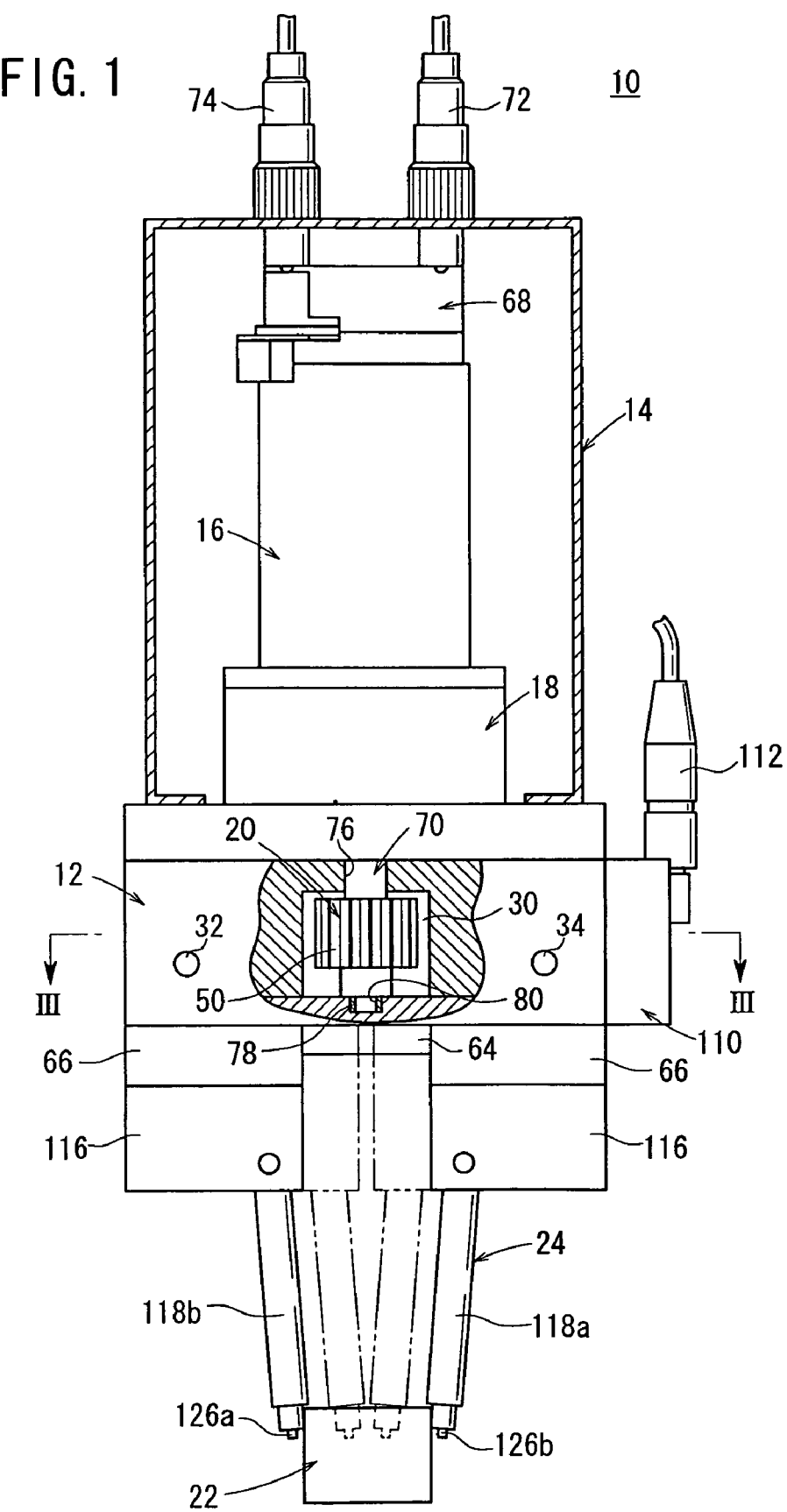
FIG. 1 is, in partial cross section, a front view illustrating a workpiece-gripping chuck according to an embodiment of the present invention.

With reference to FIG. 1, reference numeral 10 indicates a workpiece-gripping chuck according to an embodiment of the present invention.

Figure 2:
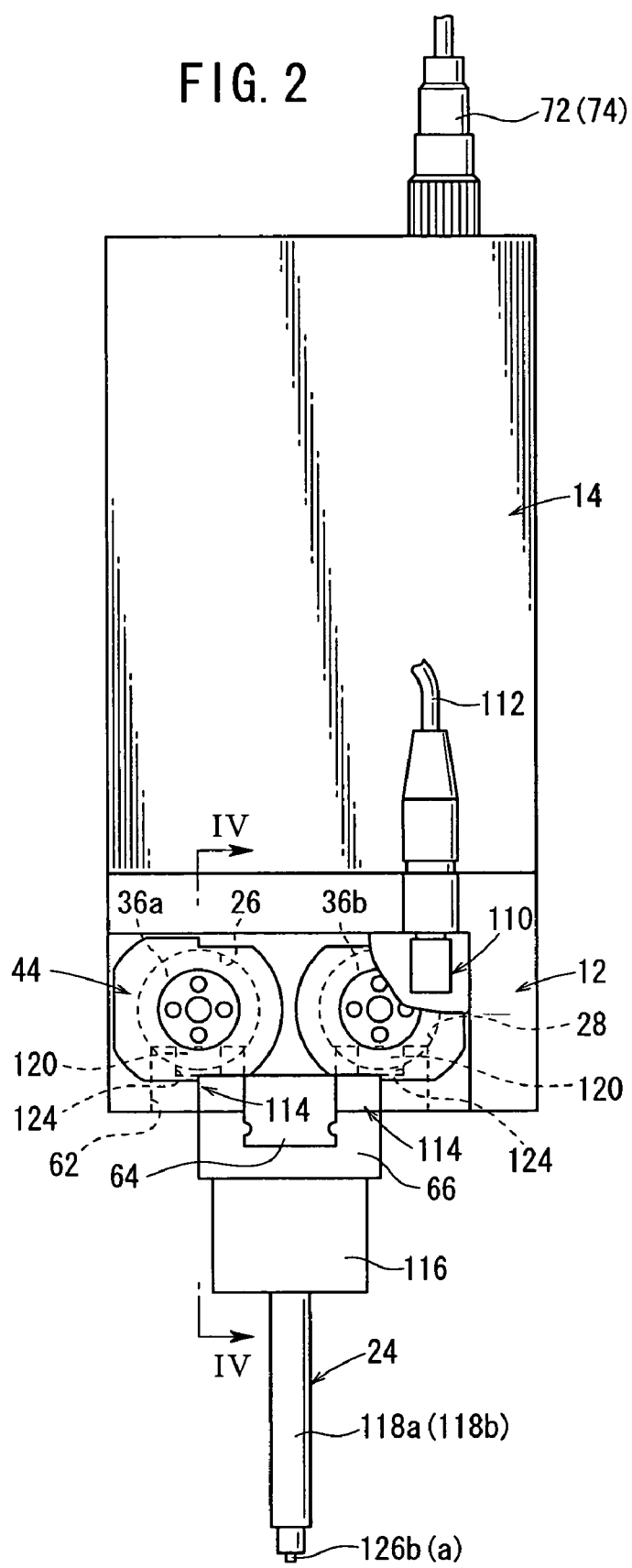
FIG. 2 is a side view illustrating the workpiece-gripping chuck shown in FIG. 1.

As shown in FIGS. 1 and 2, the workpiece-gripping chuck 10 (hereinafter simply referred to as "gripping chuck 10") comprises a body 12 having a substantially rectangular cross section, a casing 14 provided on the body 12, a rotary driving source 16 provided in the casing 14, a gear section 18 which effects a speed change of the driving force supplied from the rotary driving source 16, a converting mechanism 20 that converts the driving force subjected to the speed change by the gear section 18 into a rectilinear motion, and a gripping section 24, which is provided under the body 12 and which grips a workpiece 22 by an opening/closing action thereof.

Figure 3:
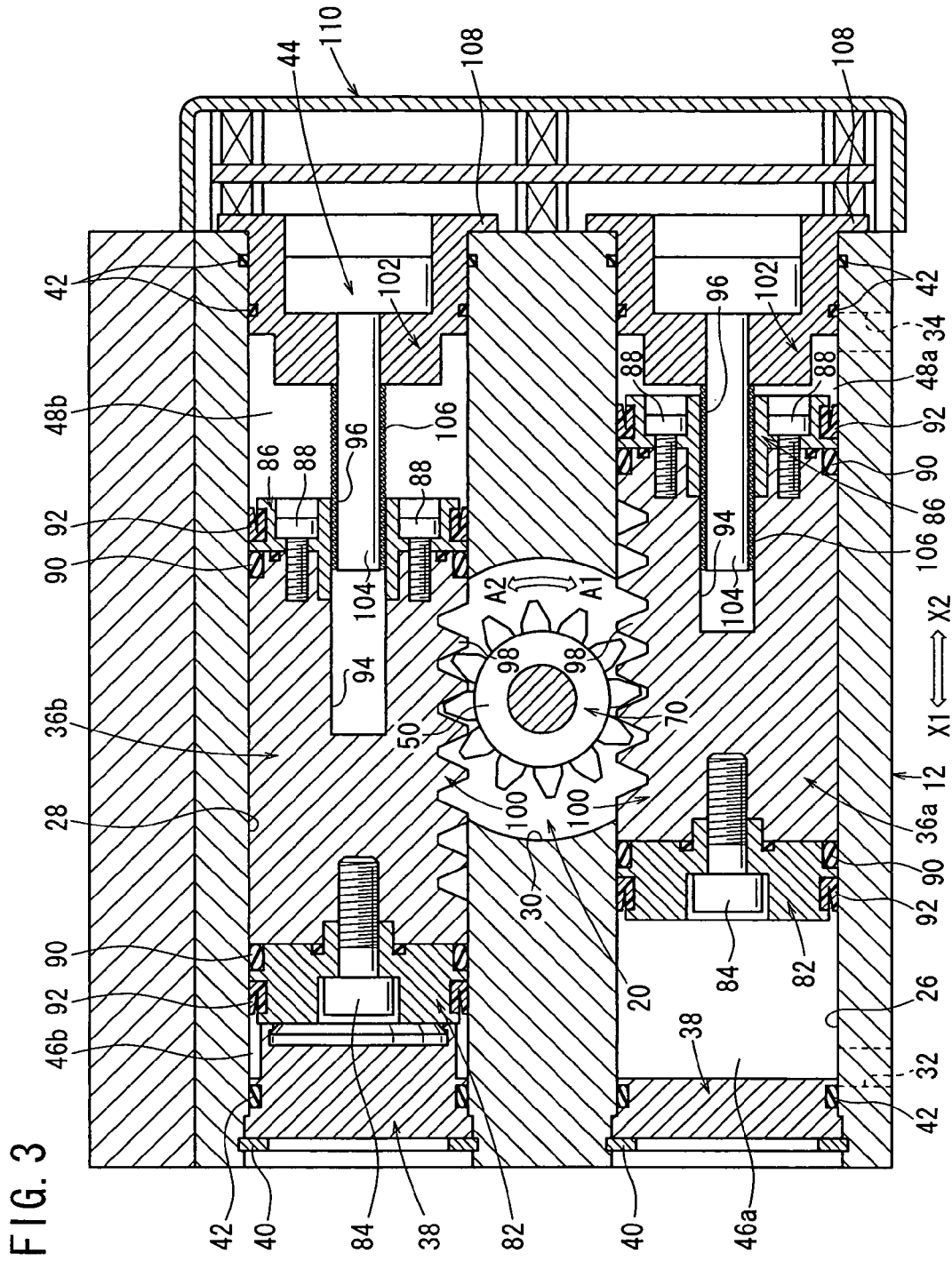
FIG. 3 is a sectional view taken along a line III-III shown in FIG. 1.

As shown in FIG. 3, the body 12 includes a pair of first and second through holes 26, 28 formed therein in the axial direction, a communication hole 30 formed at a substantially central portion of the body 12 between the first and second through holes 26, 28, and first and second ports 32, 34 (see FIG. 1) which supply a pressure fluid into the first and second through holes 26, 28. The communication hole 30 extends in a vertical direction such that the communication hole 30 is substantially perpendicular to the first and second through holes 26, 28 that extend in a substantially horizontal direction.

The first and second through holes 26, 28 are formed in parallel at substantially symmetrical positions about an axial center of the body 12. A pair of first and second pistons 36a, 36b, which are displaceable in the axial direction, are provided in the first and second through holes 26, 28 respectively.

Caps 38 are engaged with first ends of the first and second through holes 26, 28 through steps formed at openings thereof respectively. Fastening members 40, each of which has a substantially C-shaped cross section, are installed after the caps 38 have been engaged, thereby installing the caps 38 into the first and second through holes 26, 28. In this arrangement, seal members 42 are installed in annular grooves on the inner circumferential surfaces of the caps 38. Therefore, air tightness in the first and second through holes 26, 28 is reliably retained.

Displacement amount-measuring mechanisms 44 (for example, linear sensors), which detect displacement amounts of the first and second pistons 36a, 36b as described later on, are provided at second ends of the first and second through holes 26, 28. That is, the first and second through holes 26, 28 are closed by the caps 38 and the displacement amount-measuring mechanisms 44, and thereby function as cylinder chambers in which the first and second pistons 36a, 36b are displaceable in respective axial directions (directions of the arrows X1, X2).

In particular, the first cylinder chambers 46a, 46b are provided between the first and second pistons 36a, 36b and the caps 38 respectively in the first and second through holes 26, 28. The second cylinder chambers 48a, 48b are provided between the first and second pistons 36a, 36b and the displacement amount-measuring mechanisms 44. In other words, the chambers, which are disposed on the sides of the caps 38 with respect to the first and second pistons 36a, 36b (in the direction of the arrow X1), function as the first cylinder chambers 46a, 46b. The chambers, which are disposed on the sides of the displacement amount-measuring mechanisms 44 with respect to the first and second pistons 36a, 36b (in the direction of the arrow X2), function as the second cylinder chambers 48a, 48b.

The displacement amount-measuring mechanisms 44 may also be provided on the first end sides of the first and second through holes 26, 28, and the caps 38 may be provided on the second end sides of the first and second through holes 26, 28.

On the other hand, a pinion gear 50 (described later on) of the converting mechanism 20 is provided in the communication hole 30 of the body 12. The first through hole 26 and the second through hole 28 communicate with each other via the communication hole 30. With this arrangement, a state is given in which parts of outer circumferential portions of the pinion gear 50 slightly protrude into the first and second through holes 26, 28 respectively (see FIG. 3).

As shown in FIGS. 1 and 3, the first and second ports 32, 34 are formed on a side surface of the body 12 while being separated from each other by a predetermined distance. The first and second ports 32, 34 communicate with the first cylinder chambers 46a, 46b and the second cylinder chambers 48a, 48b respectively via passages 52 formed in the body 12 (see FIG. 5). The first and second ports 32, 34 are connected to a pressure fluid supply source via unillustrated tubes. A pressure fluid, which is fed from the pressure fluid supply source, is supplied from the first and second ports 32, 34 and via the passages 52 to the first cylinder chambers 46a, 46b and the second cylinder chambers 48a, 48b.

Figure 5:
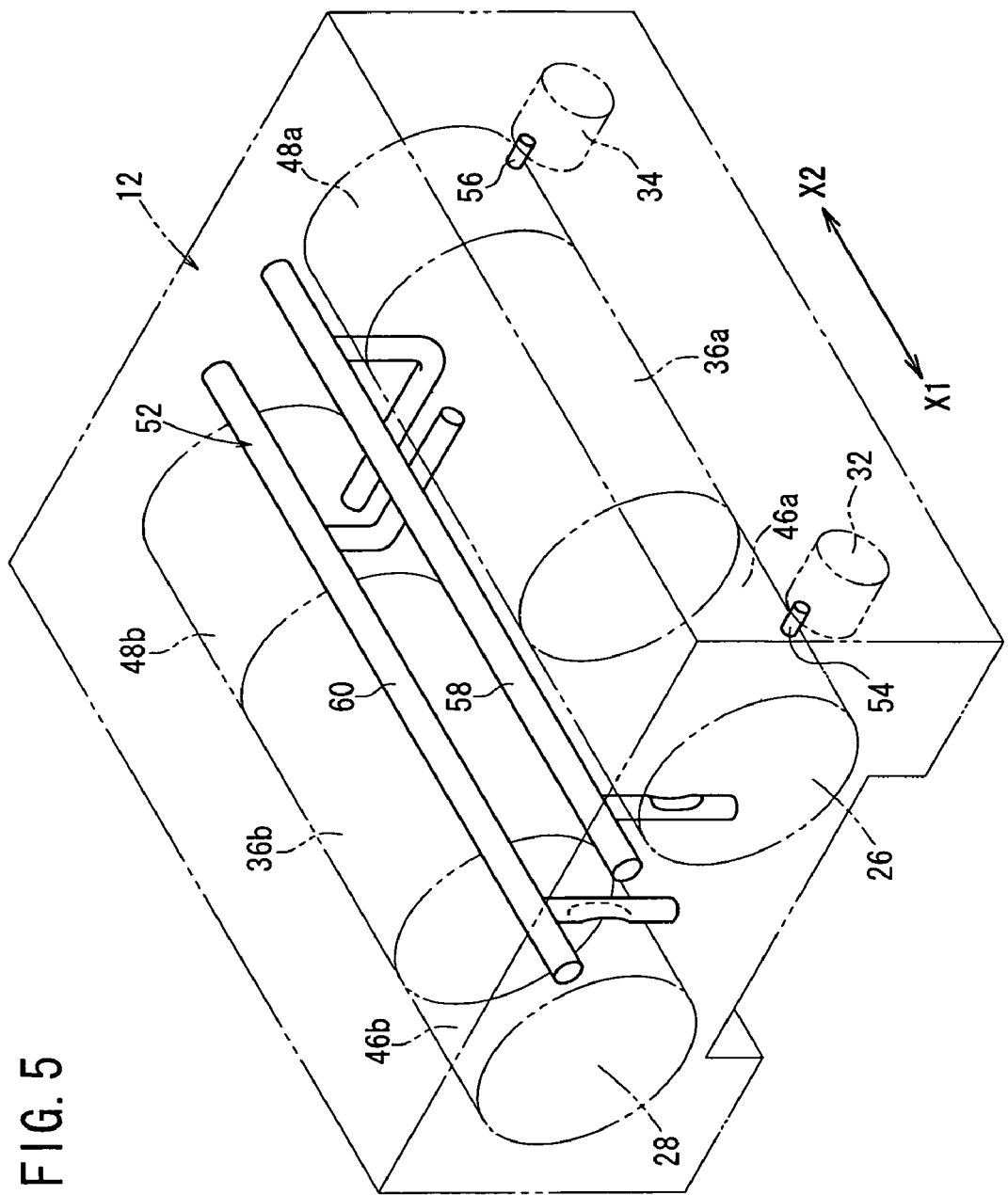
FIG. 5 is a schematic perspective view illustrating routes of fluid passages formed in a body through which the pressure fluid flows.

In particular, as shown in FIG. 5, the first port 32 communicates via a first passage 54 with the first cylinder chamber 46a, which is disposed closely to the first port 32. Further, the second port 34 communicates via a second passage 56 with the second cylinder chamber 48a. The first cylinder chamber 46a and the second cylinder chamber 48b communicate with each other via a third passage 58, which is formed between the first through-hole 26 and the second through hole 28. Further, the second cylinder chamber 48a and the first cylinder chamber 46b communicate with each other via a fourth passage 60. The fourth passage 60 is also provided substantially in parallel to the third passage 58, between the first through hole 26 and the second through hole 28.

That is, the pressure fluid, which is supplied to the first port 32, is introduced into the first cylinder chamber 46a of the first through hole 26 via the first passage 54, and the pressure fluid is introduced into the second cylinder chamber 48b of the second through hole 28 via the third passage 58. On the other hand, the pressure fluid, which is supplied to the second port 34, is introduced into the second cylinder chamber 48a of the first through hole 26 via the second passage 56, and the pressure fluid is introduced into the first cylinder chamber 46b of the second through hole 28 via the fourth passage 60. In this way, the pressure fluid is supplied from the first and second ports 32, 34 to the first cylinder chambers 46a, 46b and to the second cylinder chambers 48a, 48b, which are disposed diagonally about the center of the communication hole 30 of the body 12 (see FIG. 3).

Accordingly, the first and second pistons 36a, 36b are displaced in axial directions (in the directions of the arrows X1, X2) as a result of pressure from the pressure fluid, which is introduced from the first and second ports 32, 34 into the first cylinder chambers 46a, 46b and the second cylinder chambers 48a, 48b.

For example, when the pressure fluid is supplied to the first port 32, then the first piston 36a is displaced toward the displacement amount-measuring mechanism 44 (in the direction of the arrow X2) under a pressing action effected by the pressure fluid introduced into the first cylinder chamber 46a, and the second piston 36b of the second through hole 28 is displaced toward the cap 38 (in the direction of the arrow X1) under a pressing action effected by the pressure fluid introduced into the second cylinder chamber 48b of the second through hole 28 via the third passage 58. That is, the first piston 36a and the second piston 36b are always displaced in mutually opposite directions.

When the pressure fluid is supplied to the second port 34, the first and second pistons 36a, 36b are displaced in respective directions opposite to those described above.

As shown in FIG. 2, a recess 62, which is recessed by a predetermined depth and which extends in a substantially horizontal direction, is formed at a lower portion of the body 12. A pair of displaceable joint members 114 are provided respectively for the gripping section 24 within the recess 62.

A guide rail 64, which protrudes downwardly by a predetermined length, is formed in the axial direction at a substantially central portion of the recess 62. First blocks 66 of the gripping section 24, which are connected to the joint members 114, are supported displaceably by the guide rail 64, while being separated from each other by a predetermined distance in the axial direction of the body 12.

As shown in FIGS. 1 and 2, the casing 14 is formed to have a substantially rectangular box-shaped configuration, and is fixed to an upper portion of the body 12 by the aid of bolts (not shown). Inside the casing 14 are disposed the gear section 18, which is provided at one end on the side of the body 12, the rotary driving source (driving section) 16, which is provided on an upper portion of the gear section 18, and a first detecting section 68, which is provided on an upper portion of the rotary driving source 16 and which detects the amount of rotation or the angle of rotation of the rotary driving source 16.

The rotary driving source 16 comprises, for example, a stepping motor, a DC brush-equipped motor, or a DC brushless motor. An unillustrated drive shaft of the rotary driving source 16 is connected to the gear section 18. The driving force of the rotary driving source 16 is transmitted to the gear section 18 via the drive shaft.

The first detecting section 68 comprises, for example, a rotary encoder. The amount of rotation or the angle of rotation of the rotary driving source 16, which is detected by the first detecting section 68, is output as a detection signal to an unillustrated controller. A control signal (pulse signal), which is based on the detection signal, is output from the controller to the rotary driving source 16, in order to control the amount of rotation or the angle of rotation of the rotary driving source 16.

The gear section 18 includes a plurality of gears (not shown), which are meshed with each other. A driving force, which is output from the rotary driving source 16, undergoes a predetermined amount of speed change in accordance with the gear ratio of the gears, and then the driving force is transmitted to a rotary shaft 70 of the converting mechanism 20.

A power source cable 72 for supplying current to the rotary driving source 16, and a control cable 74 for outputting to a controller (not shown) the amount of rotation or the angle of rotation of the rotary driving source 16, as detected by the first detecting section 68, are connected to upper portions of the casing 14.

The converting mechanism 20 comprises the rotary shaft 70, which is connected to the rotary driving source 16 via the gear section 18 and which is supported rotatably with respect to the body 12, and the pair of first and second pistons 36a, 36b (see FIG. 3), which are displaceable in the axial direction in the first and second through holes 26, 28 of the body 12.

One end of the rotary shaft 70 is rotatably retained by a guide hole 76 of the body 12. The other end of the rotary shaft 70 is inserted into a hole 80 formed on the bottom surface of the body 12 by the aid of a collar member 78. The pinion gear 50, having gear teeth 98 engraved on an outer circumferential surface thereof, is formed at a substantially central portion of the rotary shaft 70 in the axial direction, and is arranged in the communication hole 30 of the body 12.

Figure 4:
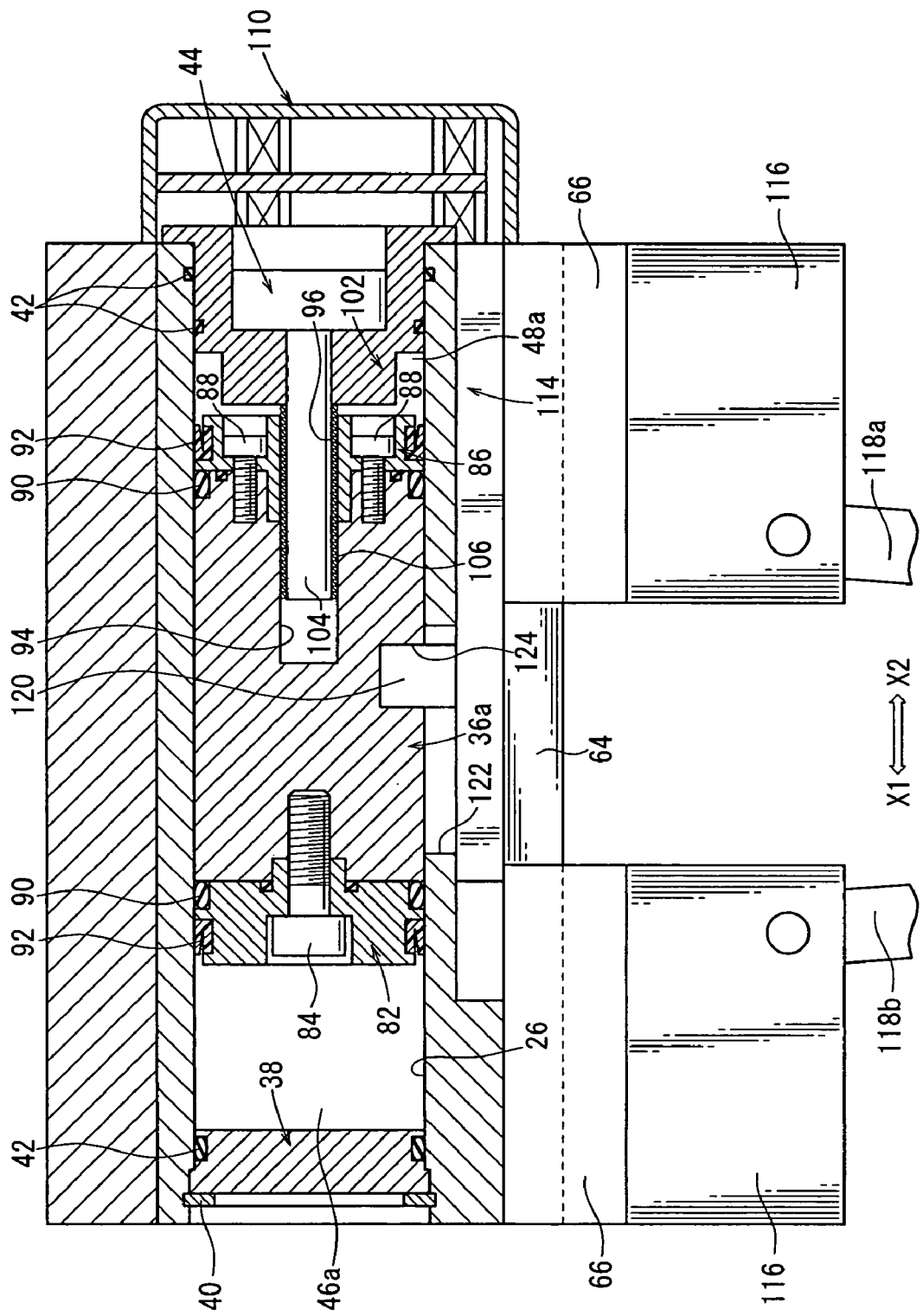
FIG. 4 is a sectional view taken along a line IV-IV shown in FIG. 2.

Each of the first and second pistons 36a, 36b is formed from a magnetic material such as iron. As shown in FIGS. 3 and 4, the first and second pistons 36a, 36b are provided in the first and second through holes 26, 28 respectively. First head members 82 are connected by bolts 84 to first end sides of the first and second pistons 36a, 36b disposed on the sides of the caps 38 (in the direction of the arrow X1). Further, second head members 86 are connected by bolts 88 to second end sides disposed on the sides of the displacement amount-measuring mechanisms 44 (in the direction of the arrow X2).

O-rings 90 and piston packings 92 are installed in annular grooves on the outer circumferential surfaces of the first and second head members 82, 86. The O-rings 90 and piston packings 92 abut against the inner circumferential surfaces of the first and second through holes 26, 28. Accordingly, air tightness is retained in the first cylinder chambers 46a, 46b and the second cylinder chambers 48a, 48b formed in the first and second through holes 26, 28 as a result of the first and second head members 82, 86.

Rod holes 94, which are recessed in the axial direction, are formed on second end sides of the first and second pistons 36a, 36b. The rod holes 94 communicate with holes 96, which are formed at substantially central portions of the second head members 86. Rods 104 of the displacement amount-measuring mechanisms 44 are inserted into the rod holes 94 and into the holes 96 under a displacement action of the first and second pistons 36a, 36b.

On the other hand, as shown in FIG. 3, the first and second pistons 36a, 36b include rack sections 100, which are engraved with gear teeth 98 and which are formed on side surfaces opposed to the pinion gear 50 respectively. The rack sections 100 are meshed with the pinion gear 50, which protrudes into the first and second through holes 26, 28 via the communication hole 30 respectively. That is, the first piston 36a and the second piston 36b are provided respectively in an opposing relation about the center of the pinion gear 50 by the aid of the rack sections 100. The first and second pistons 36a, 36b are displaceable in axial directions (in the direction of the arrows X1, X2), by the aid of the pinion gear 50 and the rack sections 100, under a rotary action of the rotary shaft 70.

That is, the first and second pistons 36a, 36b and the rotary shaft 70 are provided so that their axes are substantially perpendicular to one another. The rotary driving force of the rotary shaft 70 is converted into a rectilinear displacement of the first and second pistons 36a, 36b, in a substantially horizontal direction, by the aid of the pinion gear 50 and the rack sections 100.

In this arrangement, the first and second pistons 36a, 36b are arranged substantially symmetrically with respect to the axis of the body 12 about the center of the pinion gear 50. Therefore, the first piston 36a and the second piston 36b are displaced in mutually opposite directions. For example, when the pinion gear 50 is rotated in a clockwise direction (in the direction of the arrow A1), then the first piston 36a is displaced toward the cap 38 (in the direction of the arrow X1), and the second piston 36b is displaced oppositely toward the displacement amount-measuring mechanism 44 (in the direction of the arrow X2).

On the other hand, when the pinion gear 50 is rotated in a counterclockwise direction (in the direction of the arrow A2), then the first piston 36a is displaced toward the displacement amount-measuring mechanism 44 (in the direction of the arrow X2), and the second piston 36b is displaced toward the cap 38 (in the direction of the arrow X1), in directions opposite to those described above respectively.

The displacement amount-measuring mechanisms 44 include caps 102, which close the first and second through holes 26, 28 of the body 12 respectively, the rods 104, which are installed in the caps 102 and which protrude toward the first and second pistons 36a, 36b (in the direction of the arrow X1), and coils 106, which are wound around the outer circumferential surfaces of the rods 104. Each of the caps 102 is formed to have a substantially U-shaped cross section, and the caps 102 are engaged with the second ends of the first and second through holes 26, 28, through the aid of brims 108 formed at circumferential edges thereof. Air tightness is retained in the first and second through holes 26, 28 by seal members 42, which are installed on the outer circumferential surfaces of the caps 102.

The invention is not limited to an arrangement in which displacement amount-measuring mechanisms 44 are provided for both the first and second through holes 26, 28, respectively, to detect the displacement amounts of the first and second pistons 36a, 36b. The displacement amount-measuring mechanism 44 may be provided for only one of the first or second through holes 26, 28, in order to detect a displacement amount of either one of the first or second pistons 36a, 36b.

The coil 106 is wound around the outer circumferential surface of the rod 104 substantially uniformly in one layer, or in multiple layers, in the axial direction (direction of the arrow X1, X2).

The displacement amount-measuring mechanisms 44 are operated such that the rods 104, having the coils 106 wound thereon, undergo displacement in the rod holes 94 and in the holes 96, under a displacement action of the first and second pistons 36a, 36b. Accordingly, the inductance of the coil 106 is changed, and such an inductance change is detected by the second detecting section 110, which is connected to the end of the coil 106.

Figure 6:
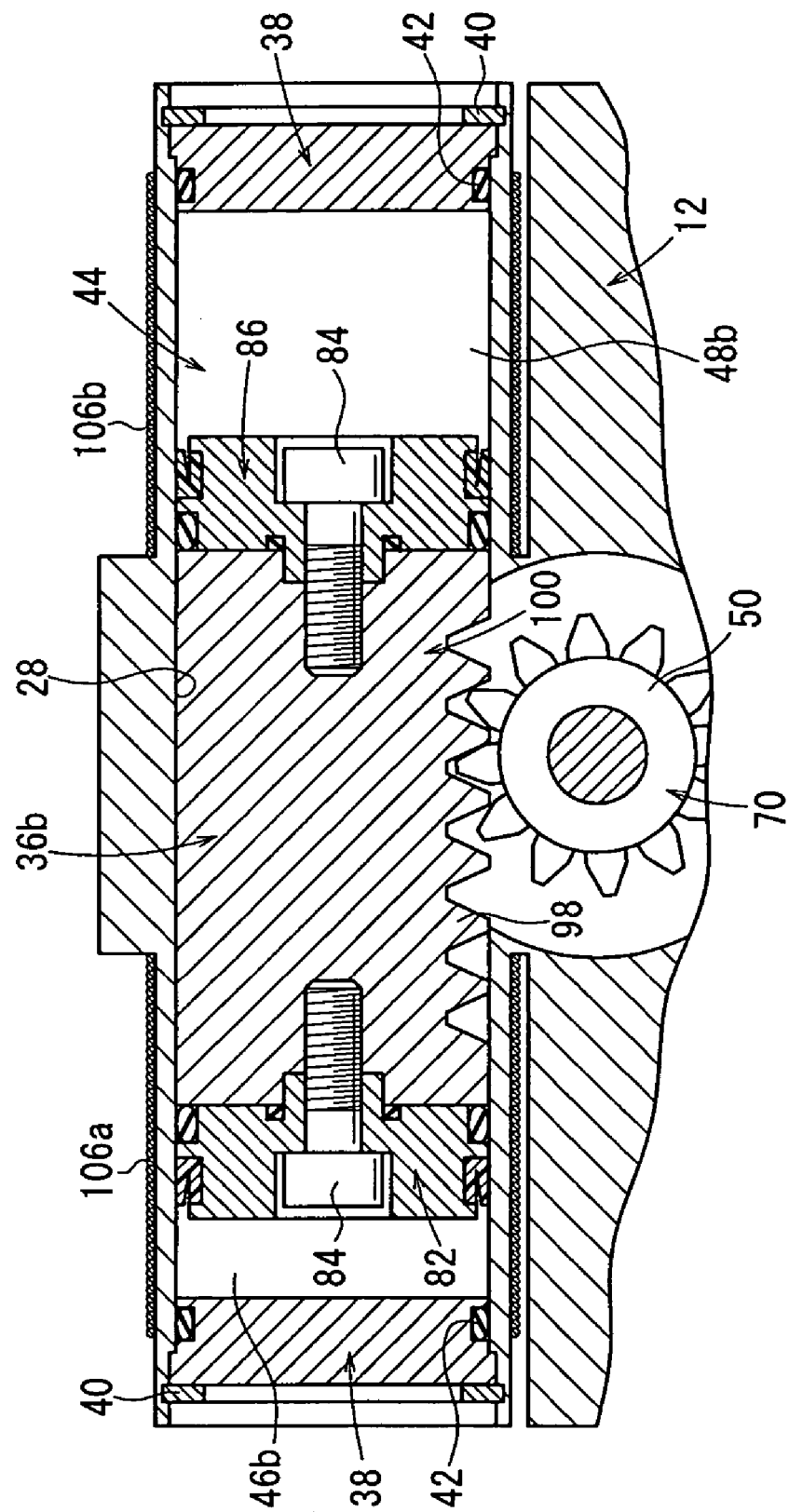
FIG. 6 is, with partial omission, a lateral sectional view illustrating a modified embodiment of a displacement amount-measuring mechanism of the gripping chuck.

On the other hand, for example, a displacement amount-measuring mechanism 44a may be also provided, in place of the displacement amount-measuring mechanism 44 described above. That is, as shown in FIG. 6, respective coils 106a, 106b are wound around the outer wall surface of the body 12, outside of the first and second cylinder chambers 46b, 48b provided with the second piston 36b. The displacement amount of the second piston 36b can be detected due to a difference in the output voltages, or the output frequencies, produced by the pair of coils 106a, 106b.

With respect to the displacement amount-measuring mechanism 44a described above, an arrangement has been explained in which the coils 106a, 106b are provided on the body 12 outside of the second through hole 28, in order to detect the displacement amount of the second piston 36b. However, the coils 106a, 106b may also be provided outside of the first through hole 26, in order to detect a displacement amount of the first piston 36a. Alternatively, portions of the body 12 disposed outside of the first and second through holes 26, 28 may be formed in a cylindrical fashion respectively, wherein coils 106a, 106b are wound therearound, respectively, in order to detect displacement amounts of both the first and second pistons 36a, 36b.

Further, alternatively, the coil 106 may be wound around only one of outer portions of the first cylinder chambers 46a, 46b or the second cylinder chambers 48a, 48b, in order to detect a displacement amount of either one of the first piston 36a or the second piston 36b.

As shown in FIGS. 1 and 4, the second detecting section 110 is installed on the side surface of the body 12, in order to detect an inductance change of the coil 106, through the aid of an unillustrated inductance detector provided therein. An output signal, which is based on an output voltage or an output frequency of the inductance detector, is output to an unillustrated controller via a control cable 112 connected to the second detecting section 110. Accordingly, axial displacement amounts of the first and second pistons 36a, 36b are calculated by the controller, on the basis of the output signal.

A gripping section 24 is provided under the body 12. The gripping section 24 includes a pair of joint members 114, which are displaceable in an axial direction under a displacement action of the first and second pistons 36a, 36b of the converting mechanism 20, a pair of first blocks 66, which are connected to the joint members 114 and which approach and separate from one another along the guide rail 64, second blocks 116, which are connected to the first blocks 66, and a pair of gripping members 118a, 118b, which are connected respectively to the second blocks 116 and which grip the workpiece 22.

The joint members 114 are provided respectively in a recess 62 formed at the lower portion of the body 12. Projections 120 (see FIG. 4), which protrude toward the first and second pistons 36a, 36b disposed in the body 12, are formed for the joint members 114. The projections 120 are inserted into engaging holes 124 of the first and second pistons 36a, 36b via insertion holes 122, which penetrate through the recess 62 and the first and second through holes 26, 28 of the body 12. Accordingly, when the first and second pistons 36a, 36b are displaced in the axial direction, the joint members 114 are displaced in the axial direction along the recess 62 integrally with the first and second pistons 36a, 36b.

As shown in FIG. 4, the insertion hole 122 extends a predetermined length in the axial direction of the body 12. When the first and second pistons 36a, 36b are displaced in the axial direction, they are always covered by the outer circumferential surfaces of the insertion holes 122. That is, the insertion holes 122 are prevented from communicating with the first cylinder chambers 46a, 46b and the second cylinder chambers 48a, 48b. The pressure fluid, which is contained in the first cylinder chambers 46a, 46b and the second cylinder chambers 48a, 48b, does not leak outside via the insertion holes 122, owing to the O-rings 90 and piston packings 92 installed on the first and second head members 82, 86, and thus air tightness is retained.

The first blocks 66 are provided displaceably along the guide rail 64 of the body 12, and are connected to lower side portions of the joint members 114 through the aid of unillustrated bolts. Therefore, when the joint members 114 are displaced together with the first and second pistons 36a, 36b, the first blocks 66 are displaced linearly in the axial direction under a guiding action of the guide rail 64.

As shown in FIGS. 1 and 2, the gripping members 118a, 118b are connected to lower portions of the second blocks 116 through holes (not shown). The gripping members 118a, 118b are formed as shafts extending downwardly by predetermined lengths. The forward ends of the gripping members 118a, 118b are inclined by predetermined angles in directions so as to approach one another. Further, pins 126a, 126b, which are diametrally reduced as compared with the gripping members 118a, 118b, are installed on the forward ends thereof respectively.

One gripping member 118a is connected to the first piston 36a through the aid of the first and second blocks 66, 116, and the other gripping member 118b is connected to the second piston 36b through the aid of the first and second blocks 66, 116. The gripping members 118a, 118b are displaceable in an integrated manner under displacement actions of the first and second pistons 36a, 36b.

The workpiece-gripping chuck 10 according to the embodiment of the present invention is basically constructed as described above. Next, its operation, functions, and effects shall be explained.

At first, an explanation shall be made, concerning a case in which positioning control of the workpiece 22 is performed by controlling an opening/closing amount of the gripping members 118a, 118b of the gripping chuck 10.

Figure 7:
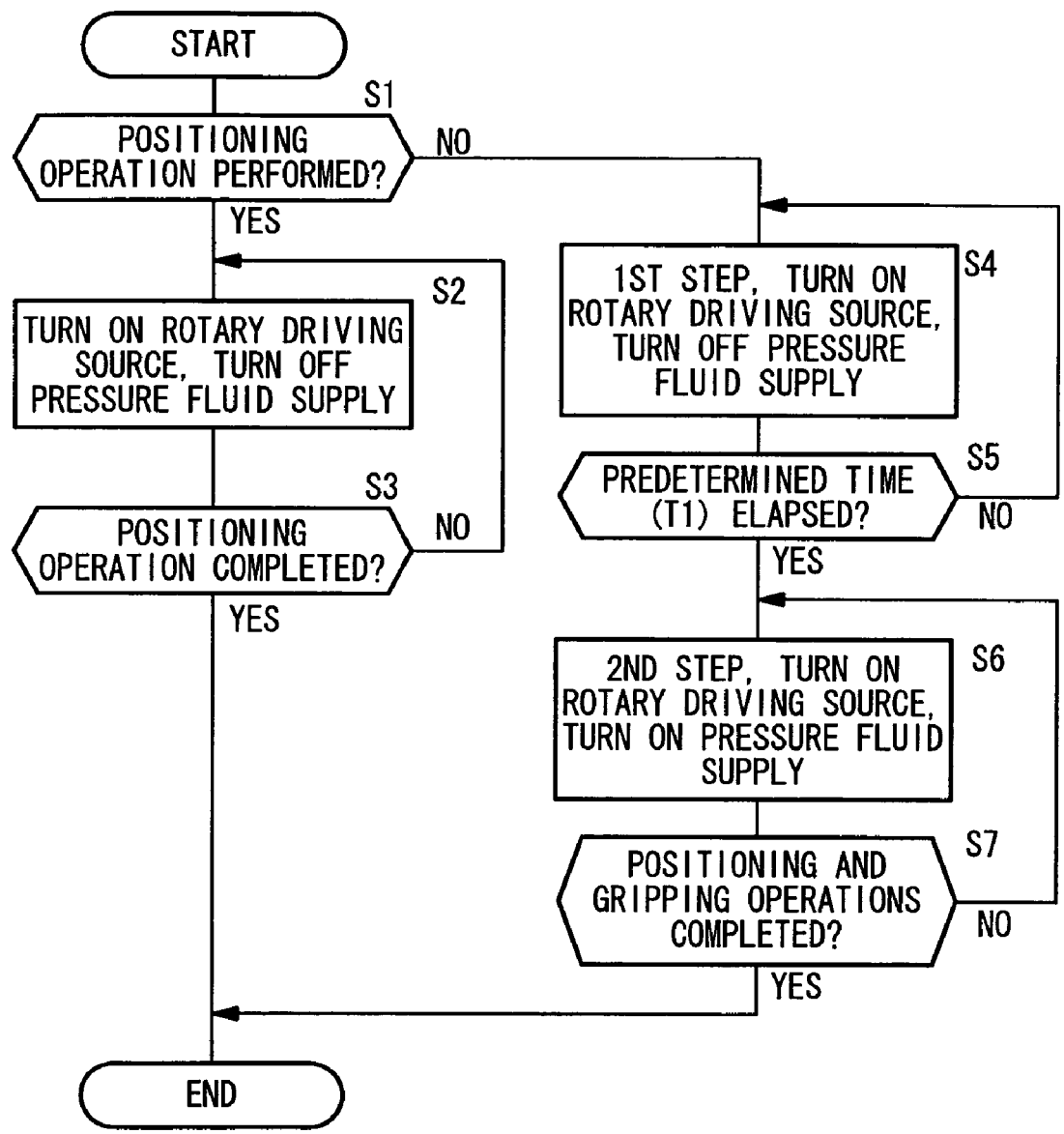
FIG. 7 is a flow chart for executing controls in which the driving force brought about by a rotary driving source, and the pressing force brought about by the pressure fluid, are switched or used in combination in the workpiece-gripping chuck.

As shown in FIG. 7, in Step Si, first, it is judged whether or not an opening/closing amount of the gripping members 118a, 118b shall be controlled, in order to perform positioning control only for the workpiece 22. If positioning control only is to be performed using the gripping members 118a, 118b, the routine proceeds to Step S2.

In Step S2, current from an unillustrated power source is applied as a control signal (pulse signal) to the rotary driving source 16 by the controller (see the range 8a shown in FIG. 8). The rotary driving source 16 is driven and rotated a predetermined amount on the basis of the control signal. In this situation, supply of pressure fluid from an unillustrated pressure fluid supply source to the first and second ports 32, 34 of the body 12 is stopped (see the range 8a shown in FIG. 8). In other words, only the opening/closing amount of the gripping members 118a, 118b is controlled during this step to perform, for example, solely a positioning operation for the workpiece 22. Accordingly, a gripping force, which is required for gripping the workpiece 22, is not required at this time. Therefore, supply of pressure fluid is unnecessary.

The driving force supplied from the rotary driving source 16 undergoes a predetermined speed change through the aid of the gear section 18, and then the driving force is transmitted to the rotary shaft 70. The rotary shaft 70 is rotated clockwise (in the direction of the arrow Al shown in FIG. 3). Accordingly, the first and second pistons 36a, 36b, which are meshed with the pinion gear 50, are displaced in directions to approach one another. In particular, the first piston 36a is displaced toward the cap 38 (in the direction of the arrow X1), and the second piston 36b is displaced toward the displacement amount-measuring mechanism 44 (in the direction of the arrow X2).

As a result, the gripping members 118a, 118b are displaced in directions to approach one another, by the aid of the joint members 114, which are engaged with the first and second pistons 36a, 36b and the first and second blocks 66, 116 connected to the joint members 114. The gripping members 118a, 118b are stopped in a state in which the workpiece 22 is gripped thereby (see FIG. 1).

As described above, the rotary driving source 16 is driven on the basis of a control signal set beforehand by the controller, and a driving force of the rotary driving source 16 is transmitted while being converted into rectilinear displacement of the pair of first and second pistons 36a, 36b, through the aid of the pinion gear 50. Accordingly, the gripping members 118a, 118b, which are connected to the first and second pistons 36a, 36b, can be opened and closed by a predetermined opening/closing amount.

During this procedure, the displacement amount-measuring mechanisms 44 are used to detect inductance changes in the coils 106, respectively, when the first and second pistons 36a, 36b are displaced. The displacement amounts of the first and second pistons 36a, 36b can be detected on the basis of output voltages or output frequencies brought about by such changes in inductance. As a result, it is possible to more accurately control the opening/closing amount of the gripping members 118a, 118b on the basis of the detected displacement amounts of the first and second pistons 36a, 36b.

The displacement amount-measuring mechanisms 44 include the rods 104 around which the coils 106 are wound corresponding to the pair of first and second pistons 36a, 36b, respectively, to thereby detect the respective displacement amounts of the first and second pistons 36a, 36b. Therefore, it is possible to improve resolution, as compared with a case in which only one rod 104 is provided singly with a displacement amount-measuring mechanism 44, to detect a displacement amount of only one of the first and second pistons 36a, 36b. As a result, it is possible to improve detection accuracy when detecting the displacement amounts of the first and second pistons 36a, 36b using the displacement amount-measuring mechanisms 44. In other words, it is possible to suppress a dispersion in detection accuracy, which would otherwise be caused by changes in the environment in which the gripping chuck 10 is used. Therefore, it is always possible to obtain accurate displacement amounts of the first and second pistons 36a, 36b in a stable fashion.

Accordingly, the opening/closing amount of the gripping members 118a, 118b can be freely controlled while performing an opening/closing operation of the pair of gripping members 118a, 118b with respect to the workpiece 22, and while controlling an amount of rotation or an angle of rotation of the rotary driving source in accordance with a control signal applied to the rotary driving source 16. Therefore, it is possible to perform highly accurate positioning of the workpiece 22. During this procedure, it is also possible to control the opening/closing speed of the gripping members 118a, 118b.

In Step S3, when the gripping members 118a, 118b of the gripping section 24 perform the opening/closing operation to provide a preset opening/closing amount, it is judged whether or not the positioning operation of the workpiece 22 has been completed, and when completion of the positioning operation is confirmed, then the present process based on the flow chart shown in FIG. 7 terminates. If the positioning operation by the gripping members 118a, 118b has not been completed, then the routine proceeds to Step S2, and the opening/closing operation continues to be performed with the gripping members 118a, 118b, again on the basis of the control signal applied to the rotary driving source 16, in order to continue positioning control for the workpiece 22.

On the other hand, after the completion of the positioning operation for the workpiece 22 by the gripping chuck 10, the workpiece 22 is released from the gripped state effected by the gripping members 118a, 118b. During this procedure, as shown in FIG. 8, application of a control signal to the rotary driving source 16 is first stopped (see the range 8b shown in FIG. 8), and then a control signal is applied so that the rotary driving source 16 is driven and rotated in the opposite direction (see the range 8c shown in FIG. 8). In this situation, supply of the pressure fluid to the gripping chuck 10 is still stopped (see the ranges 8b, 8c shown in FIG. 8).

Accordingly, the first and second pistons 36a, 36b are displaced in directions opposite to those designated when positioning control is performed, under the driving action of the rotary driving source 16. Therefore, the gripping members 118a, 118b connected to the first and second pistons 36a, 36b are displaced in directions so as to separate from each other. Accordingly, the workpiece 22 is released from the gripped state effected by the gripping members 118a, 118b.

Next, an explanation will be made in detail concerning a case in which the opening/closing amount of the gripping members 118a, 118b is controlled depending on a shape of the workpiece 22, and wherein a gripping operation is performed on the workpiece 22.

At first, in Step Si shown in FIG. 7, it is judged whether or not an opening/closing amount of the gripping members 118a, 118b of the gripping chuck 10 will be controlled in a manner to perform only positioning control. In this case, the routine proceeds to Step S4, because gripping of the workpiece 22 is to be performed simultaneously with positioning control as described above.

In other words, when the routine proceeds to Step S2, in order to perform only positioning control with the gripping chuck 10 in Step S1, the gripping chuck 10 is placed in a positioning control mode. When the routine proceeds to Step S4, in order to perform gripping of the workpiece 22 in addition to positioning control with the gripping chuck 10, the gripping chuck 10 is placed in a torque control mode, wherein a predetermined gripping force can be provided.

Subsequently, in Step S4, current is applied as a control signal (pulse signal) to the rotary driving source 16 from an unillustrated power source, through the aid of the controller (see the range 9a shown in FIG. 9). The rotary driving source 16 is rotated by a predetermined amount on the basis of the control signal. Accordingly, the first and second pistons 36a, 36b are displaced in axial directions, by the aid of the pinion gear 50 and under the driving action of the rotary driving source 16. The gripping members 118a, 118b connected to the first and second pistons 36a, 36b are displaced in directions to approach one another. Positioning control of the workpiece 22 is performed by the gripping members 118a, 118b. In this situation, supply of pressure fluid from the pressure fluid supply source is stopped with respect to the first and second ports 32, 34 of the body 12 (see the range 9a shown in FIG. 9).

Subsequently, it is confirmed whether or not a predetermined time T1 (for example, 100 to 200 sec) has elapsed from supplying the control signal to the rotary driving source 16. If the elapsed time is less than the predetermined time T1 (T1>T), the routine repeats Step S4 again. If the elapsed time is not less than the predetermined time T1 (T1≦T), the routine proceeds to Step S6.

In Step S6, as shown in FIG. 9, the control signal is continuously output to the rotary driving source 16, while pressure fluid is supplied to the second port 34 from an unillustrated pressure fluid supply source (see the range 9b shown in FIG. 9). In this situation, the first port 32 is in a state of being open to atmospheric air. Pressure fluid is introduced from the second port 34 and via the second passage 56 into the second cylinder chamber 48a of the first through hole 26. Accordingly, the first piston 36a is pressed toward the cap 38 (in the direction of the arrow Xi). Further, pressure fluid, which is introduced from the second cylinder chamber 48a and via the fourth passage 60 into the first cylinder chamber 46b of the second through hole 28, presses the second piston 36b toward the displacement amount-measuring mechanism 44 (in the direction of the arrow X2).

That is, a rotary driving force supplied from the rotary driving source 16 is applied as a driving force in axial directions to the first and second pistons 36a, 36b under a meshing action of the pinion gear 50 and the rack sections 100. Further, a pressing force, which is exerted by the pressure fluid supplied from the second port 34, is applied to the first and second pistons 36a, 36b. In this situation, the driving force and the pressing force are both applied to the first piston 36a in the same direction (in the direction of the arrow X1), and the driving force and the pressing force are both applied to the second piston 36b in the same direction (in the direction of the arrow X2).

As a result, the pressing force exerted by the pressure fluid is applied to the gripping members 118a, 118b which are displaceable under the displacement action of the first and second pistons 36a, 36b, in combination with and in addition to the driving force exerted by the rotary driving source 16. Therefore, a large gripping force can be obtained in order to grip the workpiece 22.

In Step S6, a control is conducted such that the pressure fluid is supplied only after the elapse of a predetermined time T1 after the control signal has been output to the rotary driving source 16. For example, if the pressure fluid is supplied before the control signal has been input to the rotary driving source 16, the first and second pistons 36a, 36b are displaced in axial directions under the pressing action effected by the pressure fluid. Therefore, a load is imposed at the meshing portions between the pinion gear 50 of the rotary shaft 70 and the rack sections 100 of the first and second pistons 36a, 36b, consequently causing the durability of the rack sections 100 and the pinion gear 50 to be lowered.

Therefore, as described above, a control is conducted such that the pressure fluid is supplied only after the elapse of the predetermined time T1 after the control signal has been output to the rotary driving source 16. Accordingly, an excessively large load is not applied between the pinion gear 50 and the gear teeth 98 of the rack sections 100, and thus durability of the rack sections 100 and the pinion gear 50 is not lowered.

In Step S7, it is confirmed whether or not the workpiece 22 has been properly gripped by the pair of gripping members 118a, 118b, and then the gripping operation of the gripping members 118a, 118b of the gripping section 24 is completed. If the gripping operation is not yet completed, the routine proceeds to Step S6. When the gripping operation has been completed, the present process based on the flow chart shown in FIG. 7 terminates.

On the other hand, when the workpiece 22 is released from the gripped state effected by the gripping chuck 10, supply of the pressure fluid to the second port 34 is stopped, and the control signal having been applied to the rotary driving source 16 is stopped, as shown in FIG. 9 (see the range 9c shown in FIG. 9). Then, a control signal is applied so that the rotary driving source 16 is driven and rotated in the opposite direction (see the range 9d shown in FIG. 9). Pressure fluid is supplied to the first port 32 after the elapse of a predetermined time T2 following driving of the rotary driving source 16. (see the range 9e shown in FIG. 9). In this situation, the second port 34 is in a state of being open to atmospheric air.

Accordingly, the first and second pistons 36a, 36b are displaced in directions opposite to those designated when the workpiece 22 was gripped, in accordance with the driving force of the rotary driving source 16 and the pressing force exerted by the pressure fluid. Therefore, the gripping members 118a, 118b connected to the first and second pistons 36a, 36b are displaced in directions to separate from each other. Accordingly, the workpiece 22 is released from the gripped state effected by the gripping members 118a, 118b.

As described above, in the embodiment of the present invention, it is possible to select and switch operations depending on the situation of use of the gripping chuck 10, such that the gripping members 118a, 118b may be subjected to an opening/closing operation with a driving force being applied only by the rotary driving source 16, or alternatively, the gripping members 118a, 118b may be subjected to an opening/closing operation with a pressing force being applied by the pressure fluid in addition to the driving force of the rotary driving source 16. Therefore, the gripping chuck 10 can be used to perform gripping and positioning of the workpiece 22 highly accurately and reliably, by controlling the amount of rotation or the angle of rotation of the rotary driving source 16, to thereby control the opening/closing amount of the gripping members 118a, 118b freely and highly accurately. Further, the workpiece 22 can be gripped reliably with a sufficient gripping force under a pressing action effected by the pressure fluid. In other words, the gripping chuck 10 is provided with both positioning and gripping functions that can be applied to the workpiece 22. In this arrangement, it is also possible to control the opening/closing speed of the gripping members 118a, 118b.

For example, in the case of an electric gripping chuck in which the workpiece is gripped only by a driving force of a rotary driving source, it is necessary to provide a large size rotary driving source, when a gripping force substantially equivalent to that of a conventional air-driving type gripping chuck is desired. However, a problem arises in that the entire gripping chuck becomes consequently large-sized, due to the large size of the rotary driving source, and hence the cost thereof becomes expensive.

In contrast, in the case of the gripping chuck 10 of the present invention, positioning control for the workpiece 22, for which accuracy is required, is performed using only the driving force of the rotary driving source 16, for effecting an opening/closing operation of the gripping members 118a, 118b. When the workpiece 22 is gripped, a predetermined gripping force can be obtained by adding a pressing force caused by a pressure fluid to the driving force of the rotary driving source 16. As a result, it is unnecessary to increase the size of the rotary driving source 16 in order to increase the gripping force. Consequently, it is possible to realize a small size for the gripping chuck 10, including the rotary driving source 16.

Further, displacement amount-measuring mechanisms 44 are provided in the body 12. The displacement amount-measuring mechanisms 44 are used to measure displacement amounts of the first and second pistons 36a, 36b in axial directions respectively. Therefore, it is possible to highly accurately detect the opening/closing amount of the pair of gripping members 118a, 118b connected to the first and second pistons 36a, 36b. Accordingly, it is possible to perform a highly accurate control, for example, when positioning of the workpiece 22 is performed by the gripping members 118a, 118b.

Figure 10A:
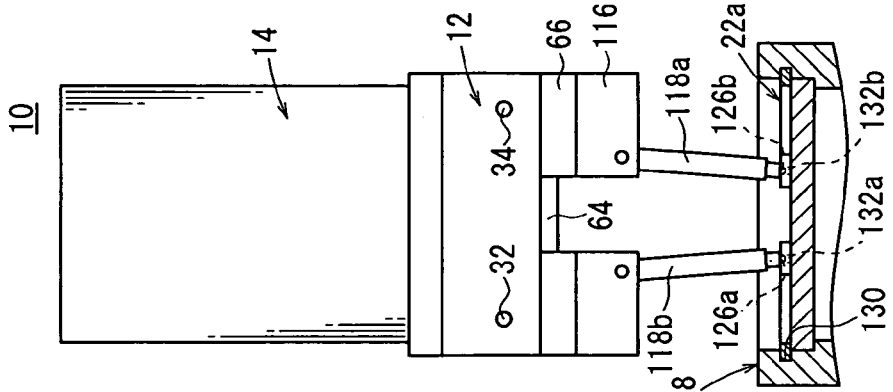
FIGS. 10A to 10D are schematic front views illustrating a case in which a substantially C-shaped fastening member is gripped by the workpiece-gripping chuck, and the fastening member is installed in an annular groove of a cylindrical member.
Figure 10B:
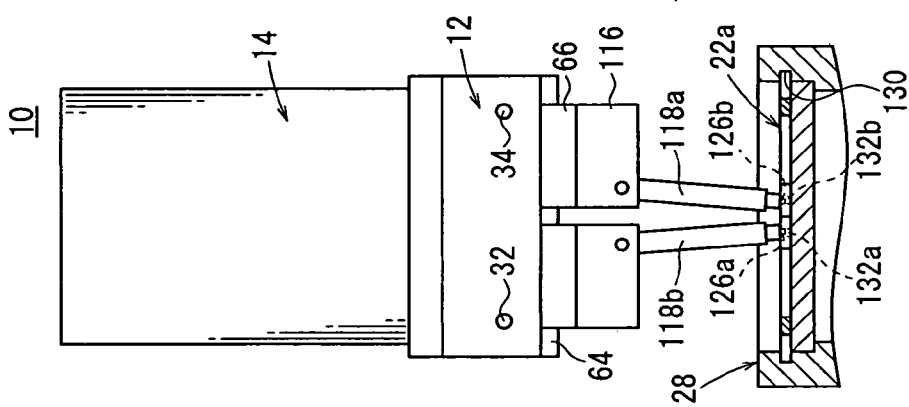
Figure 10C:
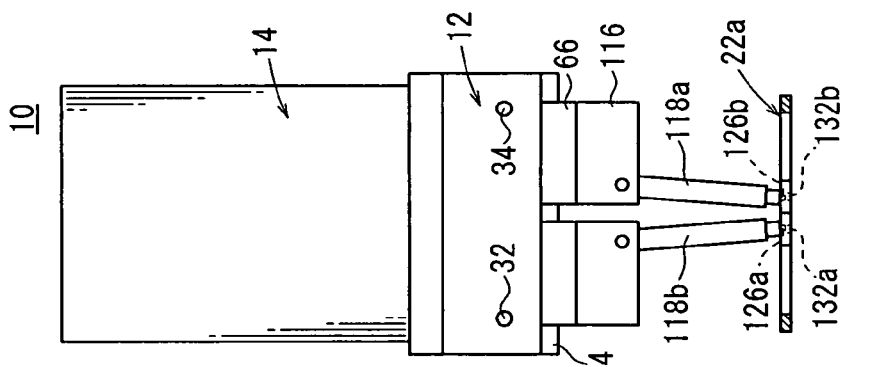
Figure 10D:
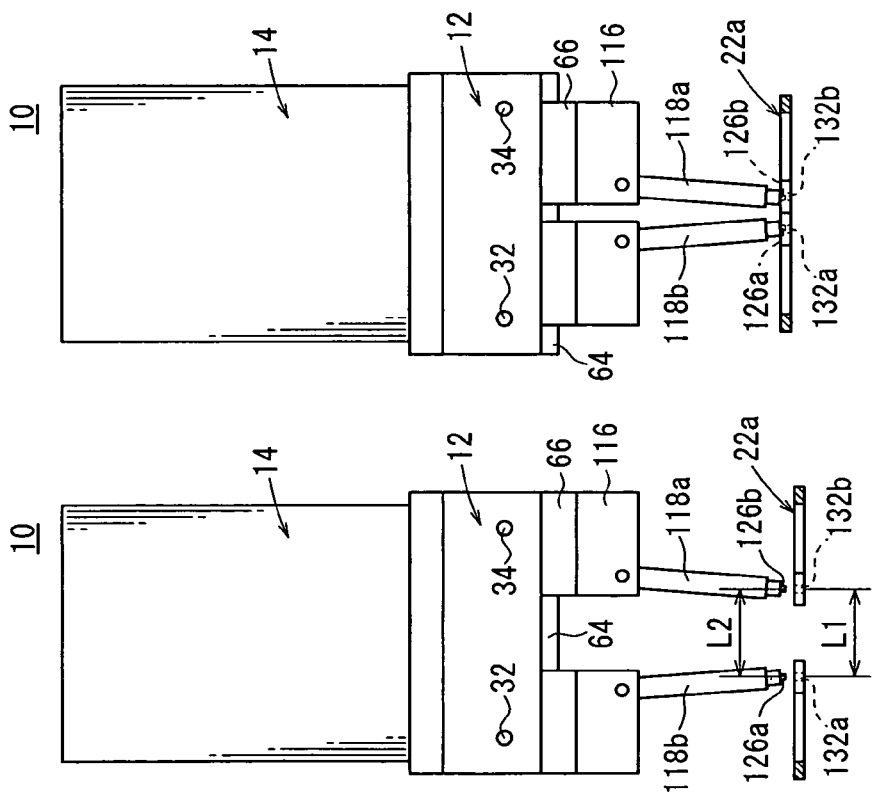

Next, an explanation shall be given concerning the case shown in FIGS. 10A to 10D, in which a substantially C-shaped workpiece 22a is gripped by the gripping chuck 10 described above, and wherein the workpiece 22a is installed in an annular groove 130 formed in a cylindrical member 128 (see, FIGS. 10C and 10D). Pin holes 132a, 132b are formed at open ends of the workpiece 22a respectively.

At first, with reference to FIG. 10A, the opening/closing amount of the gripping members 118a, 118b is controlled to perform positioning control, in order to insert the pins 126a, 126b of the gripping members 118a, 118b into the pin holes 132a, 132b of the workpiece 22a. In this case, a spacing distance L1 between the pin holes 132a, 132b of the workpiece 22a is previously set in the controller (not shown). A control signal is applied from the controller to the rotary driving source 16 in order to perform the opening/closing operation of the gripping members 118a, 118b depending on the spacing distance L1.

The gripping members 118a, 118b are displaced to approach one another or to separate from each other under a driving action of the rotary driving source 16. The opening/closing operation of the gripping members 118a, 118b is stopped when the spacing distance L2 between the pin 126a and the pin 126b is equivalent to the spacing distance L1 between the pin holes 132a, 132b (L1=L2). In this situation, supply of pressure fluid to the gripping chuck 10 is stopped.

Subsequently, the entire gripping chuck 10 is displaced downwardly using, for example, an unillustrated movement unit. The pins 126a, 126b of the gripping members 118a, 118b are inserted into the pin holes 132a, 132b of the workpiece 22. Thereafter, a control signal is applied from an unillustrated controller to the rotary driving source 16. Simultaneously, pressure fluid is supplied via the first or second port 32, 34 of the body 12.

Accordingly, the gripping members 118a, 118b are displaced in directions to approach one another under the displacement action of the first and second pistons 36a, 36b effected by the converting mechanism 20. Both open ends of the workpiece 22a are displaced in directions to approach one another respectively. The workpiece 22a is deformed radially inwardly, against a repulsive force, so that the diameter thereof is reduced (see FIG. 10B).

Subsequently, as shown in FIG. 10C, the workpiece 22a is displaced into the cylindrical member 128 by the gripping chuck 10, in a state in which the open portion of the workpiece 22a is closed. The workpiece 22a is displaced so that the outer circumferential surface of the workpiece 22a opposes the annular groove 130 of the cylindrical member 128.

Finally, the supply of pressure fluid to the gripping chuck 10 is halted, and the first or second port 32, 34 is open to atmospheric air. Further, a control signal is applied so that the rotary driving source 16 is driven and rotated in an opposite direction to that discussed above. Accordingly, the gripping members 118a, 118b are displaced in directions to separate from each other, under a driving action of the rotary driving source 16. As a result, the workpiece 22a is released from the state in which the open portion of the workpiece 22a is closed by the gripping members 118a, 118b. The workpiece 22a expands radially outwardly, by a repulsive force, so that the diameter thereof increases, whereby the workpiece 22a is installed into the annular groove 130 (see FIG. 10D).

As described above, in the case of the gripping chuck 10, the opening/closing amount of the pair of gripping members 118a, 118b can be freely controlled, in accordance with a control signal, by controlling the amount of rotation or the angle of rotation of the rotary driving source 16, wherein the control signal is supplied from an unillustrated controller. Therefore, for example, the pins 126a, 126b of the gripping members 118a, 118b can be easily inserted into the pair of pin holes 132a, 132b of the workpiece 22a, which are separated from each other by a predetermined spacing distance respectively. When the workpiece 22a is gripped, a pressing force brought about by a pressure fluid is applied to the gripping members 118a, 118b, in addition to the driving force brought about by the rotary driving source 16. Therefore, it is possible to obtain a desired gripping force for the workpiece 22a.

Figure 11:
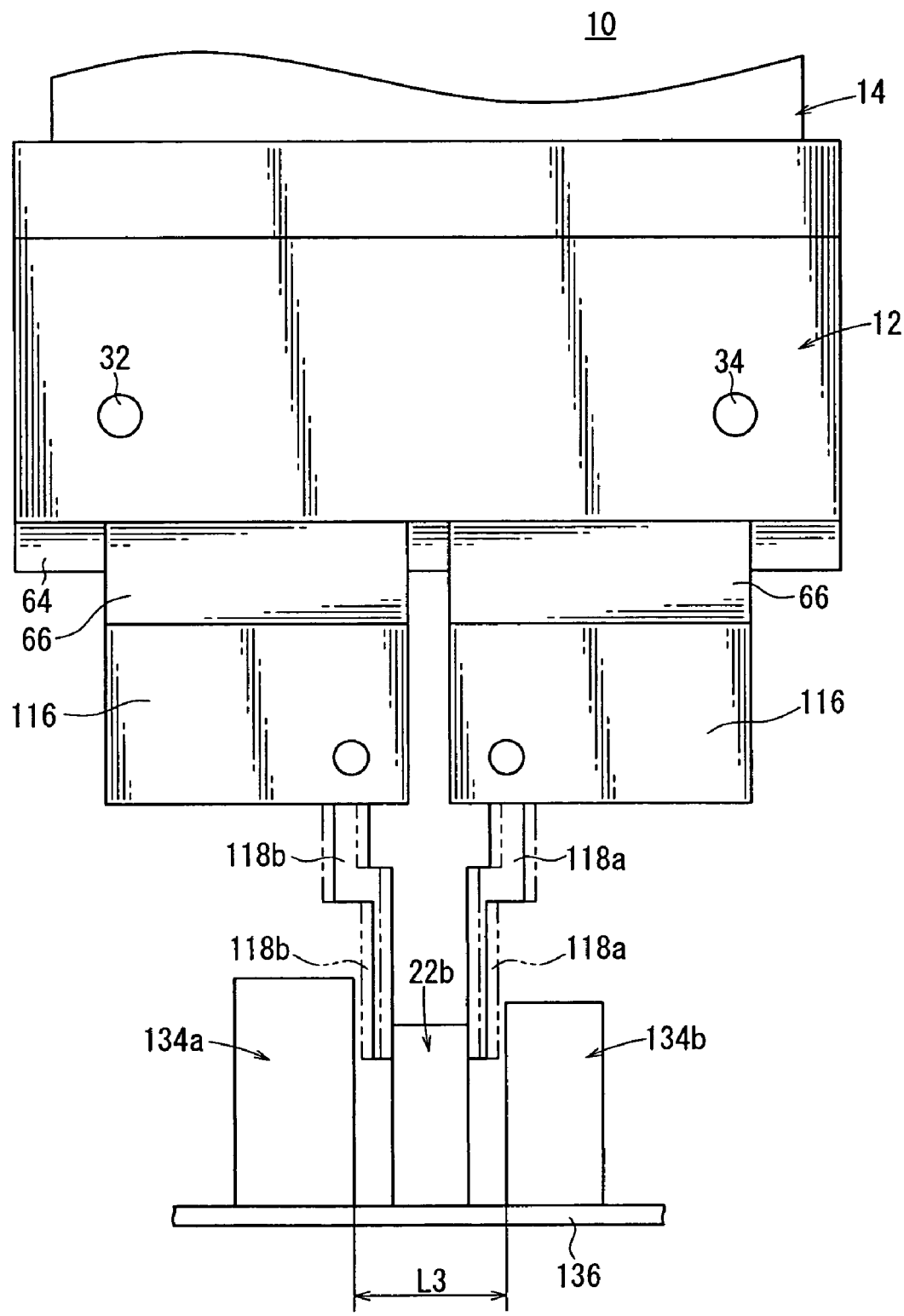
FIG. 11 is a magnified front view illustrating a case in which a workpiece is moved to a space between adjoining electronic parts using the workpiece-gripping chuck shown in FIG. 1, and wherein the chuck performs an opening operation between the electronic parts for releasing the workpiece from a gripped state.

On the other hand, as shown in FIG. 11, when a workpiece 22b, such as an electronic part, is installed onto a substrate 136 and mounted together with a plurality of other electronic parts 134a, 134b, then a control signal is first applied to the rotary driving source 16, through an unillustrated controller, and further, the workpiece 22b is gripped by the gripping members 118a, 118b in a state in which pressure fluid is supplied to the cylinder chambers of the body 12. The gripping chuck 10 is displaced downwardly to advance the workpiece 22b into the space between the adjoining electronic parts 134a, 134b.

Subsequently, the workpiece 22b is installed onto the substrate 136, and then the supply of pressure fluid is stopped, so that the interiors of the cylinder chambers are placed in a state of being open to atmospheric air. Further, a control signal, having a polarity opposite to that of the control signal discussed above, is applied to the rotary driving source 16. Accordingly, the rotary driving source 16 is driven and rotated in the opposite direction, and thus the gripping members 118a, 118b are displaced in directions so as to separate from each other. Accordingly, the workpiece 22b is released from the gripped state effected by the gripping members 118a, 118b (refer to the shapes depicted by the two-dot chain lines in FIG. 11).

In this procedure, the distance L3 between the adjoining electronic parts 134a, 134b into which the gripping members 118a, 118b are advanced is measured, and a setting is made beforehand in the controller (not shown), so that the opening/ closing amount of the gripping members 118a, 118b is provided on the basis of the previously measured spacing distance L3. The control signal is applied to the rotary driving source 16 from the controller. As a result, it is possible to control the displacement amounts of the gripping members 118a, 118b when the gripping members 118a, 118b are opened in directions to separate from each other. Therefore, when the workpiece 22b is released from the gripped state effected by the gripping members 118a, 118b, the gripping members 118a, 118b do not make any contact with the adjoining electronic parts 134a, 134b. Accordingly, it is possible to reliably perform an opening operation of the gripping members 118a, 118b even in a restricted space.

In other words, the gripping members 118a, 118b can be opened with a minimum displacement amount required for the workpiece 22b to be released from its gripped state, by controlling the amount of rotation or the angle of rotation of the rotary driving source 16 in accordance with the control signal applied to the rotary driving source 16.

An explanation shall additionally be made concerning a case in which one of a plurality of workpieces 138a to 138c having different shapes is selected and gripped by the gripping members 118a, 118b, so as to move and insert the selected workpiece into one of a plurality of installation holes 140a to 140c corresponding in shape to the workpieces 138a to 138c, respectively, as shown in FIGS. 12A and 12B. The explanation shall describe the case in which the center workpiece 138b, which is included within the plurality of workpieces 138a to 138c, is gripped and moved.

Initially, the gripping chuck 10 is moved downwardly so that the workpiece 138b is positioned between the gripping members 118a, 118b, in a fully open state in which the gripping members 118a, 118b are displaced in directions to separate from each other. When a control signal is applied to the rotary driving source 16 through the controller (not shown), the gripping members 118a, 118b are displaced in directions to approach one another, whereby the gripping members 118a, 118b abut against both side surfaces of the workpiece 138b (see FIG. 12A).

In this situation, displacement amounts of the first and second pistons 36a, 36b of the converting mechanism 20 are detected by the displacement amount-measuring mechanisms 44. The widthwise dimension W1 of the workpiece 138b is calculated by the unillustrated controller on the basis of the displacement amounts of the first and second pistons 36a, 36b. During this situation, supply of pressure fluid to the gripping chuck 10 is halted.

Subsequently, a control signal is output from the controller to the rotary driving source 16, simultaneously with pressure fluid being supplied to the cylinder chambers via the second port 34. Accordingly, the gripping members 118a, 118b are displaced in directions to approach one another by displacement of the first and second pistons 36a, 36b of the converting mechanism 20. Hence, the workpiece 138b is gripped by the gripping members 118a, 118b.

The position of the installation hole 140b having a widthwise dimension W2 corresponding to the widthwise dimension W1 of the workpiece 138b is determined on the basis of the widthwise dimension WI of the workpiece 138b calculated by the controller. The workpiece 138b is inserted into the installation hole 140b by means of the gripping chuck 10 (see FIG. 12B).

Finally, supply of pressure fluid to the gripping chuck 10 is halted, and then pressure fluid is supplied to the first port 32, which is opposite to the second port 34 discussed above. Further, the rotary driving source 16 is driven and rotated in an opposite direction to that discussed above. Accordingly, the gripping members 118a, 118b are displaced in directions to separate from each other, and the workpiece 138b is released from the gripped state effected by the gripping members 118a, 118b.

As described above, when each of the workpieces 138a to 138c is gripped by the gripping members 118a, 118b, the dimensions of the workpieces 138a to 138c can be measured on the basis of the displacement amount of the first and second pistons 36a, 36b, as measured by the displacement amount-measuring mechanisms 44. Each of the measured workpieces 138a to 138c can then be moved and inserted, for example, into a proper installation hole 140a to 140c corresponding to the outer dimension of the workpiece.

Figure 13:
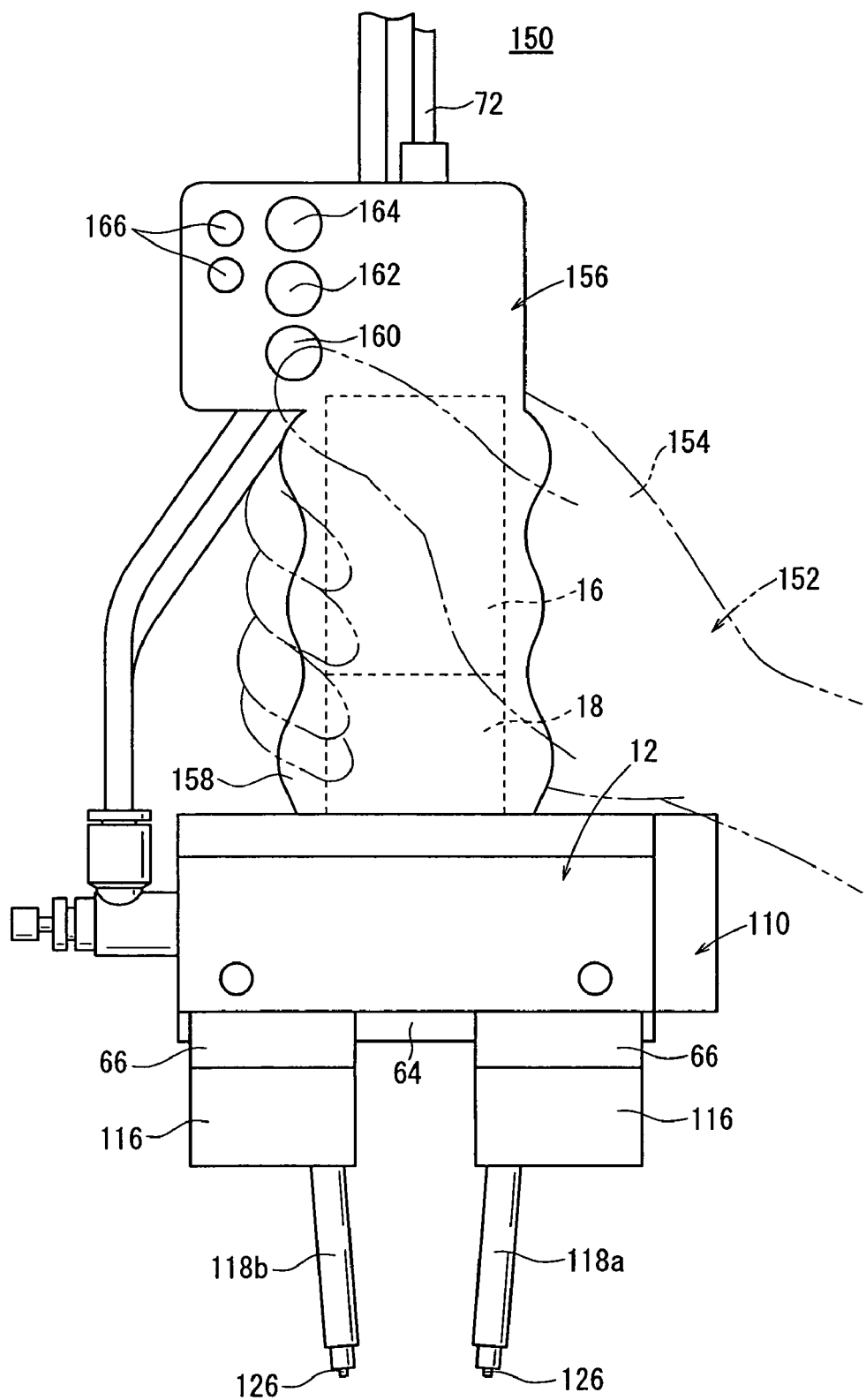
FIG. 13 is a vertical sectional view illustrating a workpiece-gripping chuck according to a modified embodiment.

The present invention is not limited to a case in which the gripping chuck 10 is necessarily attached to a forward end of a shaft of a machine tool, wherein operations for positioning and gripping the workpiece 22, 22a, 22b, 138a to 138c are automatically performed by supplying current and pressure fluid to the gripping chuck 10. Another arrangement may be provided, as a modified embodiment of the gripping chuck 10 as shown in FIG. 13, in which the gripping chuck can be gripped by a hand 154 of an operator 152, in order to perform, for example, operations for gripping, moving, or assembling the workpiece.

The gripping chuck 150 according to the modified embodiment includes a concave/convex grip 158, which is formed on the outer portion of a casing 156 fixed to the upper portion of the body 12, so that the operator 152 can grip the gripping chuck 150 with ease using one hand 154. Further, for example, an opening/closing switch 160 for effecting an opening/closing operation of the gripping members 118a, 118b, an adjusting button 162 for adjusting the opening/closing amount of the gripping members 118a, 118b, a power source switch 164 for switching the power source of the gripping chuck 150 on or off, and a plurality of display lamps 166 for visually recognizing an operation state of the opening/closing switch 160 or the like, are provided at upper portions of the casing 156. The same constitutive components as those of the gripping chuck 10 according to the embodiment of the present invention described above are designated by the same reference numerals, and detailed explanations thereof shall be omitted.

In the case of the gripping chuck 150, an operator 152 turns on the power source of the gripping chuck 150 by operating the power source switch 164. The opening/closing amount of the gripping members 118a, 118b is adjusted by means of the adjusting button 162 depending on the shape of an unillustrated workpiece. Thereafter, when the opening/closing switch 160 is depressed, the gripping members 118a, 118b are subjected to an opening/closing operation, whereby it is possible to conveniently perform operations for positioning or gripping the workpiece, independent of the shape of the workpiece.

The workpiece can be reliably gripped with a stable gripping force using the gripping chuck 150, as compared with a conventional case in which the operator 152 must perform operations for gripping or positioning the workpiece, or operations for assembling the workpiece, using a tool or the like. Therefore, it is possible to improve productivity, for example, when operations are performed for assembling workpieces. Further, it is possible to more accurately and stably position workpieces as well, when positioning operations are performed.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A workpiece-gripping chuck for gripping a workpiece by means of a pair of openable/closable gripping members, said workpiece-gripping chuck comprising:
    a body having a pair of ports to which a pressure fluid is supplied and cylinder chambers into which said pressure fluid is introduced;
    a driving section connected to said body which drives and rotates a pinion gear in accordance with an electrical signal;
    a pair of pistons displaceable in an axial direction in said cylinder chambers, wherein a driving force is transmitted to said pistons from said driving section via rack grooves meshed with said pinion gear, said rack grooves being formed on respective side surfaces of each of said pistons;
    a gripping section including said pair of gripping members connected to said pair of pistons, wherein said gripping members are openable/closable under a displacement action of said pistons; and
    a displacement amount-measuring mechanism which detects a displacement amount of said pistons in said axial direction,
    wherein said pistons are arranged oppositely to one another about a center of said pinion gear, and said pistons are displaced in said axial direction by applying said driving force from said driving section and/or a pressing force exerted by said pressure fluid.

2. The workpiece-gripping chuck according to claim 1, wherein said displacement amount-measuring mechanism detects displacement of at least one of said pair of pistons.

3. The workpiece-gripping chuck according to claim 2, wherein said displacement amount-measuring mechanism is provided on at least one of a first end side and a second end side in said axial direction of said cylinder chamber in which said piston is displaced.

4. The workpiece-gripping chuck according to claim 3, wherein:
    said displacement amount-measuring mechanism includes a rod provided on at least one of said first end and said second end of said cylinder chamber, said rod protruding toward said cylinder chamber and being inserted into said piston, and a coil wound around an outer circumferential surface of said rod in said axial direction; and
    an output voltage or an output frequency supplied from said coil is detected when said piston is displaced in said axial direction.

5. The workpiece-gripping chuck according to claim 1, wherein said displacement amount-measuring mechanism has a coil wound radially outwardly around said cylinder chamber in said axial direction, and an output voltage or an output frequency supplied from said coil is detected when said piston is displaced substantially in parallel to said coil.

6. The workpiece-gripping chuck according to claim 1, wherein said pair of pistons includes one piston and another piston which are displaced in mutually opposite directions by being meshed with said pinion gear.

7. The workpiece-gripping chuck according to claim 1, wherein forward ends of said pair of gripping members are arranged and inclined so that said forward ends approach one another.

8. The workpiece-gripping chuck according to claim 7, wherein pins, each having a diameter formed to be smaller than a diameter of each of said gripping members, are provided at said forward ends of said pair of gripping members.

9. The workpiece-gripping chuck according to claim 1, wherein said driving section includes a detecting section for detecting a rotary driving amount of said driving section.

10. The workpiece-gripping chuck according to claim 1, wherein said body includes a guide rail, which linearly and displaceably guides blocks to which said pair of gripping members are connected.

11. A method for controlling a workpiece-gripping chuck for positioning a workpiece by means of an openable/closable gripping section, said method comprising:
    applying an electric signal to a driving section, for displacing, in an axial direction, pistons meshed with a pinion gear through rack sections, by driving and rotating said pinion gear connected to said driving section;
    driving said driving section for subjecting said gripping members to a closing operation, to grip said workpiece by a driving force exerted by said driving section;
    pressing said pistons in said axial direction by supplying a pressure fluid to cylinder chambers via ports defined in a body when a predetermined time has elapsed after driving said driving section; and
    detecting a displacement amount of at least one of said pistons with a displacement amount-measuring mechanism when a pair of gripping members connected to said pistons are opened and closed,
    wherein said workpiece is positioned by arbitrarily controlling an opening/closing amount of said gripping members, and
    wherein said workpiece is gripped both by said driving force exerted by said driving section and a pressing force exerted by said pressure fluid.

12. The method for controlling said workpiece-gripping chuck according to claim 11, wherein displacement speeds of said pistons and said gripping members are controlled by controlling said electric signal applied to said driving section.

* * * * *